May 2, 1933.  J. P. MORRILL  1,907,360
ANIMAL TRAP
Filed May 24, 1932   2 Sheets-Sheet 1
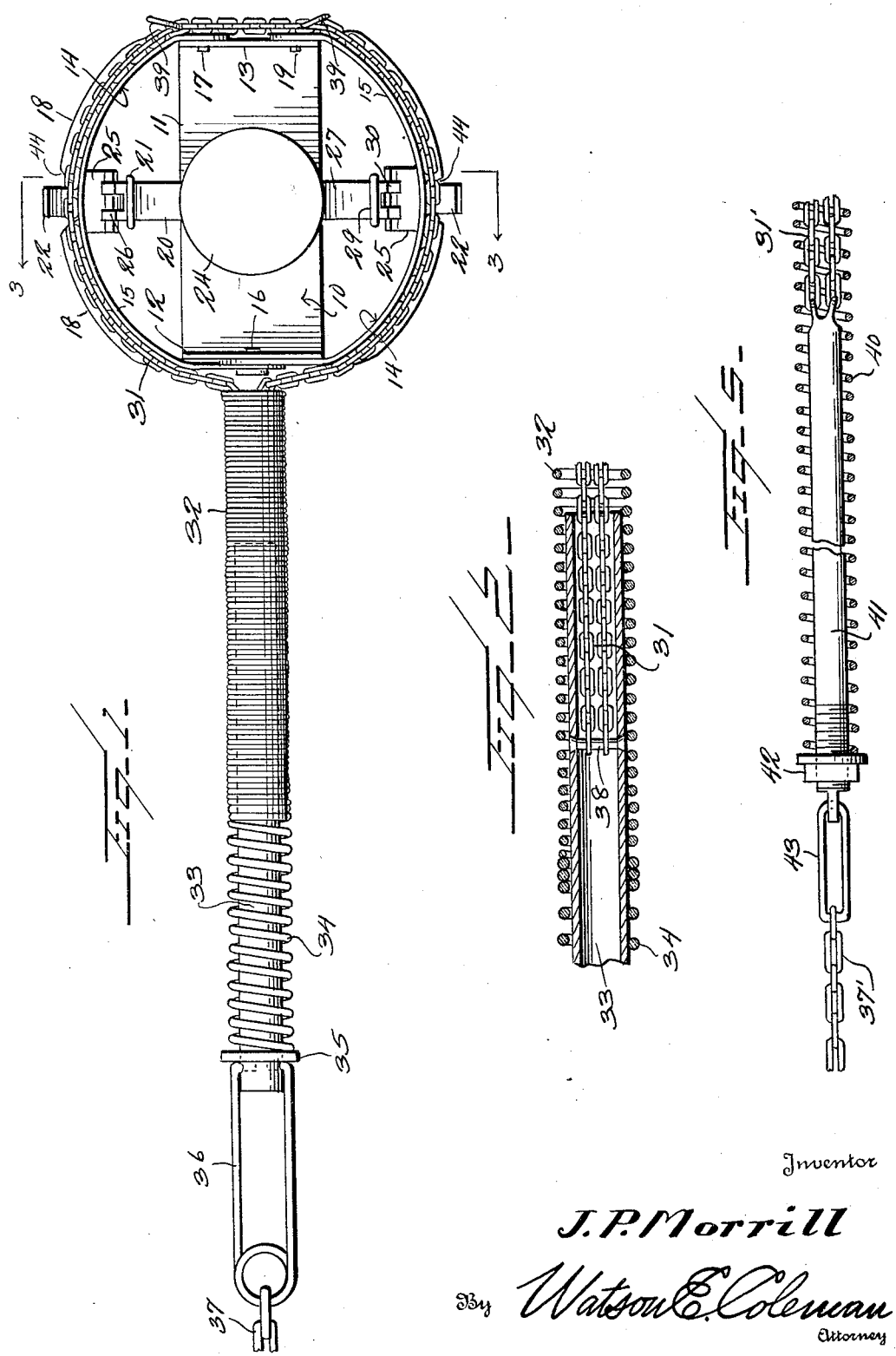
Inventor
J. P. Morrill
By Watson E. Coleman
Attorney May 2, 1933.  J. P. MORRILL  1,907,360
ANIMAL TRAP
Filed May 24, 1932  2 Sheets-Sheet 2
Fig. 3
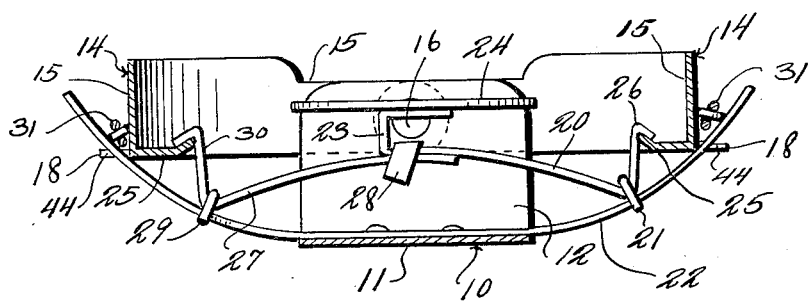
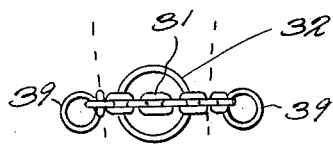
Fig. 4
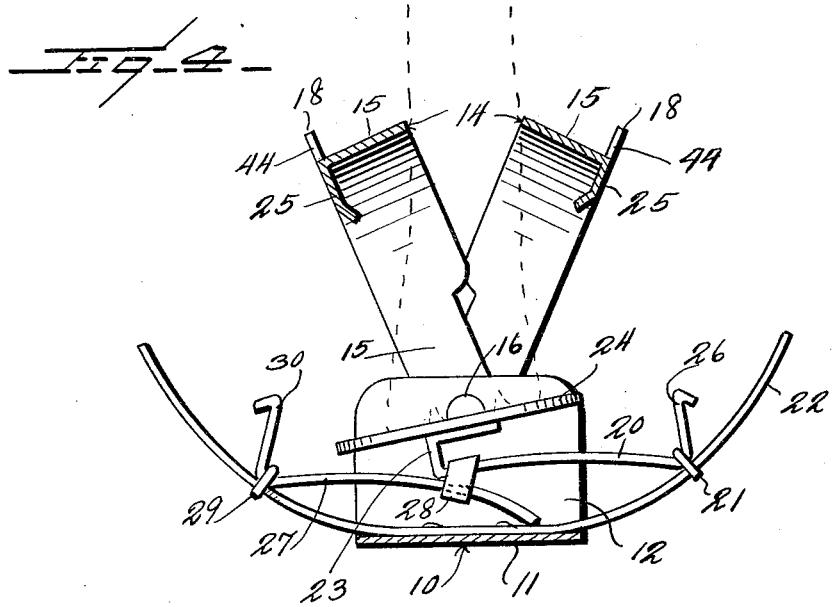
Inventor
J. P. Morrill
By Watson E. Coleman
Attorney Patented May 2, 1933

1,907,360

UNITED STATES PATENT OFFICE

JAMES P. MORRILL, OF VERDI, NEVADA

ANIMAL TRAP

Application filed May 24, 1932. Serial No. 613,277.

This invention relates to animal traps and more particularly to a trap of the noose type which is adapted to catch an animal by the leg or the like.

An object of this invention is to provide a trap which can be set at any desired point for contact with the leg of an animal which will be caught in a noose and firmly held therein while permitting the animal to have relative movement with respect to the holding means.

Another object of this invention is to provide a trap construction of this kind wherein the set mechanism is so constructed as to carry the noose in open position in a vertical movement so as to engage the leg of an animal at a point upwardly from the foot where it will not cramp or bind unduly irrespective of the movements of the animal caught in the noose.

A further object of this invention is to provide a noose construction which will firmly hold the leg of the animal without undue pain and without injury to the limb.

This invention is an improvement over the trap construction embodied in my pending application filed August 8, 1930, Serial No. 473,868.

The above and various other objects and advantages of this invention will in part be described and in part be understood from the following detailed description of the present preferred embodiment, the same being illustrated in the accompanying drawings wherein:—

Figure 1 is a detail top plan view of a device constructed according to the preferred embodiment of this invention, showing the device in open or set position.

Figure 2 is a fragmentary enlarged longitudinal section partly in detail taken through the longitudinal center of the noose and noose contracting means.

Figure 3 is a sectional view taken on the line 3—3 of Figure 1.

Figure 4 is a view similar to Figure 3 but showing the device in released or unset position and showing in dotted line the leg of an animal having a noose disposed thereabout.

Figure 5 is a fragmentary longitudinal section partly in detail of a modified form of the noose contracting means.

Referring to the drawings wherein like numerals of reference designate corresponding parts throughout the several views, the numeral 10 designates generally a trap set comprising a base 11 having upturned end portions 12 and 13. A pair of noose holding jaws generally designated as 14 is mounted for swinging movement on the upstanding lugs 12 and 13, and these jaws 14 comprise an arcuate member 15 having one end thereof secured to a pivotal member 16 carried by the lug 12 and the other end of the jaw member 15 is pivotally secured to a pivot 17 carried by the upstanding lug 13. A horizontally disposed flange 18 is formed with the jaw member 15 and provides a base or seat for holding a noose construction as hereinafter described.

These jaws 14 have one end portion thereof secured to the pivot 16 and the opposite ends of the jaws 14 are spaced apart, one being secured to the pivot 17 and the other to a pivot 19 carried by the lug 13. A tripping mechanism comprising a rock arm 20, which is rockably mounted on a loop or pivotal member 21 carried by a resilient upwardly curved jaw supporting bar 22. The tripping arm 20 is provided with a returned inner end portion 23 and a plate or tripping member 24 is secured to the upper portion of the returned extension 23, and is normally disposed in horizontal position or parallel with the base 11. A lug 25 is carried by the arcuate noose holding jaw 15 and extends in an inward and upward direction and is engaged by a hook shaped member 26 which is formed with the trigger 20. Preferably, the resilient member 22 forces the jaw 14 upwardly into an unset position, and this is resisted by the hook 26 until an animal presses the plate 24 downwardly.

A second rock arm or trigger 27 is slidable in a loop 28 carried by the first rock arm 20. This second rock arm or trigger member 27 is pivoted on a loop or pivotal member 29 carried by the spring 22. A hook 30 is formed with the trigger 27 and engages a lug 25 carried by the other jaw member 14.

As disclosed in Figure 1, a noose generally designated as 31 is disposed about the jaw members 14 and is held in taut condition by means of an expanding spring 32 which is loosely disposed about the noose or flexible member 31. This spring 32 also loosely engages about a bar or tubular member 33 and a second expanding spring 34 is mounted about the bar 33 and bears at one end against the inner end of the spring 32 while the opposite end engages against a washer or stop member 35.

A ring or loop 36 is carried by the inner end of the tubular member 33 and holds the washer 35 against movement in the direction of the adjacent end of the tube 33. A flexible member 37 may be connected to this loop or eye member 36 and this flexible member anchored to a suitable means such as a stump or stake. The noose 31 is preferably formed of a flexible member in the form of a chain or cable which is disposed in a loop formed with the free ends thereof secured to a transversely extending pin 38 carried by the tube 33.

The noose 31 is also provided with stop rings or members 39 which are spaced apart from each other adjacent the outer end of the noose so that as the noose is contracted by the spring 32, the stop members 39 will engage the outer end of the spring 32 and prevent complete telescoping of the noose or flexible member 31 by the spring 32. This construction also provides means whereby any desired size of loop may be left in the outer end of the noose so that in the event the trap is sprung by a relatively small animal, the leg of the animal will be too small to be firmly held by that portion of the noose disposed between the two stop rings or members 39.

As shown in Figure 5, the noose construction includes a flexible member 31' which is disposed about the jaws 14 of the trap set and this flexible member 31' is held in taut condition by means of an expanding spring 40 which is carried by a rod 41. In this instance, the flexible member 31' is fixedly secured to the outer end of the rod 41 as by soldering, welding or the like, and the noose contracting means in the form of the spring 40 is made in only one piece and may be tensioned through the medium of a nut 42 which is threaded onto the inner end of the rod 41.

A loop or eye 43 is loosely disposed through the inner end of the rod 41 and may be attached to an anchor by means of a flexible member 37' or the like. In the use and operation of this trap, the noose holding jaws 14 may be swung downwardly so as to engage the triggers 20 and 27, and when these jaws 14 are moved downwardly, the spring 22 will be tensioned, this spring engaging in a notch or cut out portion 44 provided in the rim or edge of the flange 18. The cable or flexible member 37 may be anchored to a suitable member and the noose 31 disposed about the vertical jaw member 15 of the trap set. This loop or noose will be held in taut position about the jaw members 14 under the action of the expanding spring 32. When the animal steps onto the plate 24, the triggers 20 and 27 will release the jaws 14, and these jaws will be carried upwardly under the tension of the spring 22 and as soon as the vertical member 15 of the jaws 14 is disposed on an angle to the vertical, the tension of the expanding spring 32 will contract the noose about the leg of the animal at a point upwardly from the foot. By providing a relatively long spring 32, the leg of the animal will not be injured while it is firmly held in the noose 31, and in the event the animal moves about unduly in an effort to get away from the trap, the spring will readily flex and, therefore, will not cause any injury to the animal. In the same manner, in the event the leg of the animal becomes swollen under the tension of the spring 32, this spring will contract a sufficient degree to permit circulation through the leg while at the same time holding the leg firmly within the noose.

It will be noted from the foregoing that the flexible member 31, which is described as a noose, is in reality a loop and is so constructed that it will not be tightened by the animal after it has closed about the limb of the animal. In other words, in an ordinary noose construction, the stronger the pull on the noose, the tighter the noose grips the member engaged thereby, whereas the loop formed with the flexible member 31 will not be contracted on account of any additional strain applied thereto by the animal who is caught therein. This feature also prevents the loop from gripping the limb of the animal so tight as to stop the circulation of blood in the limb, which action takes place where an ordinary slip noose is used.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. An animal trap comprising a noose, tensioned means carried by the noose for contracting the noose, means for holding the noose in open position against the tension of said tensioned means, trippable locking means for said holding means, and means for raising said holding means during the releasing of the noose from the holding means, said tensioned means exerting a tension on the noose when mounted on said holding means and also upon release therefrom.

2. An animal trap comprising a noose, tensioned means for contracting the noose, a pair of noose holding jaws, means for mounting said jaws for vertical swinging movement, tripping means disposed between the jaws to hold the jaws in open position against the tension of said noose contracting means, and a spring engaging the jaws to swing said jaws upwardly upon release from said tripping means whereby to raise the noose coactive with release thereof.

3. An animal trap comprising a noose, a spring disposed about the noose, means for securing one end of the spring against movement relative to the noose, a base, a pair of noose holding jaws pivoted on said base, said noose engaging about said jaws, said jaws holding the noose in open position against the tension of said spring, tripping means carried by the base and engaging the jaws to hold the jaws in open position, and resilient means carried by the base and engaging the jaws to swing said jaws upwardly and coactively raise the noose relative to the base simultaneous with the release thereof.

4. An animal trap comprising a noose, means for anchoring one end of the noose against movement, a spring having one end thereof fixed relative to the noose and the opposite end engaging about the noose to contract the noose, a base, a pair of flanged noose holding jaws, means for pivotally mounting said jaws on said base, said noose engaging about said jaws, a spring carried by the base and engaging the jaws to constantly urge the jaws upwardly into released position, and tripping means carried by the spring and engaging the jaws to hold the jaws in open position.

5. An animal trap comprising a looped noose member, a resilient noose contracting member secured at one end against movement relative to the noose and loosely engaging about the strands of the noose, a base having upturned opposite end portions, a pair of flanged jaws, means for pivotally mounting said jaws on said upturned end portions, said noose engaging about said jaws, said spring constantly urging said jaws into released position, a jaw operating spring mounted on the base and adapted to swing each of said jaws upwardly simultaneous with the release thereof, and means holding said jaws in open position against the tension of said jaw operating spring.

6. An animal trap comprising a flexible member having the central portion thereof disposed in a loop and the end portions parallel one with another, a rigid member secured to said parallel ends, a spring loosely disposed about the rigid member and about the strands of the flexible member to contract the loop upon expansion of the spring, a base, a pair of arcuate jaws, means for pivotally securing said jaws to said base, flanges carried by each of said jaws, said loop being disposed about the jaws and engaging the flange of the jaws, said spring constantly holding the loop in taut condition about the jaws, a spring carried by the base and engaging the jaws to constantly urge the jaws upwardly into open position, a jaw holding means carried by the jaw engaging spring to hold the jaws in open position, and a tripping plate carried by the jaw holding means and disposed between the jaws, said jaw engaging spring coacting with the first named spring to swing the jaws upwardly into open position above the tripping plate.

7. In an animal trap, a looped flexible member constituting a noose, a fixed member secured to said flexible member, an expansible member disposed about the fixed member and the flexible member and adapted on expansion thereof to contract the noose, and stop means carried by the flexible member to limit the contraction of the noose.

8. An animal trap comprising a looped flexible member, a fixed hollow member secured to the flexible member, said flexible member having a portion thereof disposed within the hollow member, a compression spring disposed about the fixed member, a second spring disposed about the fixed member and the flexible member to contract the loop in the flexible member upon expansion thereof, means for holding the flexible member in looped position against the tension of said latter spring, and tripping means to release the flexible member from said holding means.

In testimony whereof I hereunto affix my signature.

JAMES P. MORRILL.